May 19, 1953  J. F. CORN, JR  2,638,894
BROILER RACK OPERATING MECHANISM
Filed March 29, 1950  2 Sheets-Sheet 1

Inventor
James F. Corn, Jr.
By
Lamont Johnston
ATTORNEY

Inventor
James F. Corn, Jr.

Patented May 19, 1953

2,638,894

UNITED STATES PATENT OFFICE 2,638,894

BROILER RACK OPERATING MECHANISM

James F. Corn, Jr., Cleveland, Tenn., assignor to Hardwick Stove Company, Incorporated, Cleveland, Tenn., a corporation of Delaware Application March 29, 1950, Serial No. 152,735

4 Claims. (Cl. 126—340)

This invention relates to stoves and ranges and more particularly to means for automatically moving the broiling rack or drawer into and out of the oven compartment and for automatically assisting in closing and holding closed the oven door and in opening the door.

When cooking food in a broiler, it is often desirable or necessary to inspect the food frequently to determine whether it has been cooked to the proper degree and not burned. In order to do this, the best way to see the food, particularly in a broiler which is located in the bottom part of the stove, is to pull the broiler rack or drawer out of the broiler compartment so that a good view may be had of the food. If this must be done by hand, the cook runs a risk of burning herself in handling the hot broiler rack and also must stoop down low each time to grasp the rack. It is, for these reasons, desirable to have the rack pulled out automatically when the door is opened. Such an action has been provided heretofore in various devices and, in addition, the device shown in Patent Number 2,268,481, granted December 30, 1941, to C. L. Hardwick, provides a toggle and spring arrangement by which the spring helps to close and holds the door closed and also, after passing a given point in the opening of the door, helps to open the door. The present invention is an improvement over the invention disclosed in the aforesaid patent particularly in that the mechanism used in this invention is considerably more simple and less expensive in construction than that disclosed in the patent.

One object of this invention is to provide a broiler rack operating mechanism which is simple and inexpensive in construction and reliable in operation.

Another object is to provide a broiler rack operating mechanism which assists in opening the door and in pulling the broiler rack out.

A further object is to provide a broiler rack operating mechanism in which the oven door can be left ajar for inspection of the food being cooked while the rack is fully retracted.

The foregoing and other objects, features and advantages of this invention will be apparent from the following description and from the accompanying drawings of a preferred embodiment, it being understood that the detailed description and drawings are merely illustrative of the invention, which is defined in the claims.

In the drawings.

Like reference numerals refer to like parts throughout the several figures of the drawings.

Figure 1:
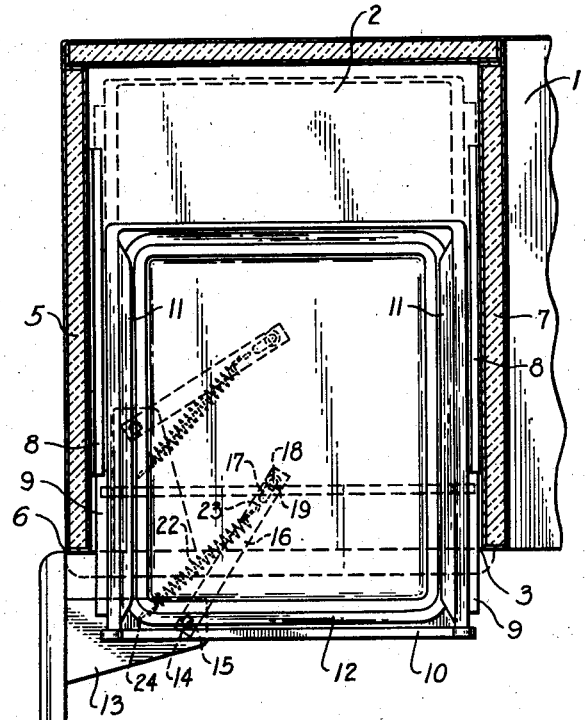
Figure 1 is a plan view, partly in section, taken substantially along the line 1—1 of Figure 2, showing the positions assumed by the lever and spring which constitute the broiler rack operating mechanism when the oven door is in open position in full lines, and when the door is in closed position in dotted lines.
Figure 2:
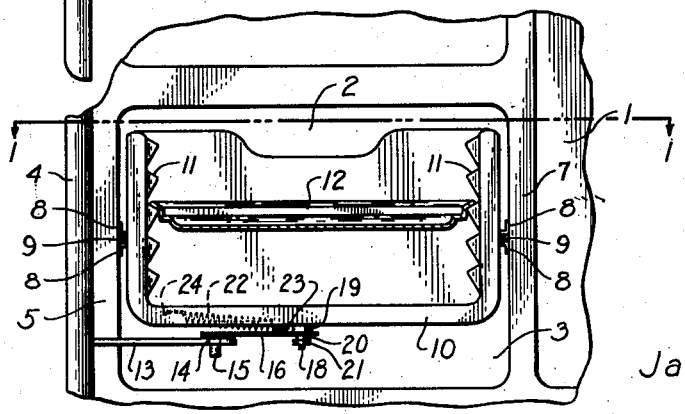
Figure 2 is a fragmentary front elevation of a stove embodying the invention and showing the broiler oven door in open position, the broiling pan being shown in section.

According to this invention, a stove or range 1 is provided with a broiling oven or compartment 2 having a door opening 3. The door opening is normally closed by a door 4 hinged to one side wall 5 of the stove 6, for swinging about a vertical axis. To each of the side walls 5 and 7 of the broiling compartment is secured a pair of brackets 8 having horizontal flanges between which the flanges 9 of a broiler rack or drawer 10 are adapted to be supported and to slide. A plurality of pairs of spaced, horizontally extending flanges or ledges 11 are provided on the inner walls of the rack 10 extending inwardly for supporting in adjustable positions at desired heights a broiling pan 12 in such a way that the pan may be slid in and out on the ledges and may be removed, as for cleaning or close inspection of the food contained therein.

The mechanism for automatically closing or opening the door 4 and for moving the rack 10 in and out of the broiling compartment 2 on the brackets 8 comprises a lug or ear 13 secured in a suitable manner, as by welding, to the inner surface of the door 4 near its hinges 6 and extending inwardly therefrom. At the inner end of the lug 13 a round hole 14 is formed therein for removably receiving a round pin or peg 15 fixed to one end of a lever 16, the lever thus being pivotally attached to the door 4. A slot 17 is cut through the other end of the lever and through this slot a bolt 18 passes, the bolt also passing through a hole in the bottom of the broiler rack 10, the hole being near the front end of the rack and slightly to the left of its longitudinal center, as seen in the drawings. A sleeve 19 provides the proper spacing of the lever 16 from the bottom of the rack 10 for permitting free actuation of a spring to be described hereinafter. If desired, a friction reducing bushing 20 may be provided on the bolt 18 below the spacing sleeve 19 to facilitate sliding and rotary movement of the lever 16 on the bolt, the assembly being held together by a nut 21 placed on the end of the bolt.

Figure 4:
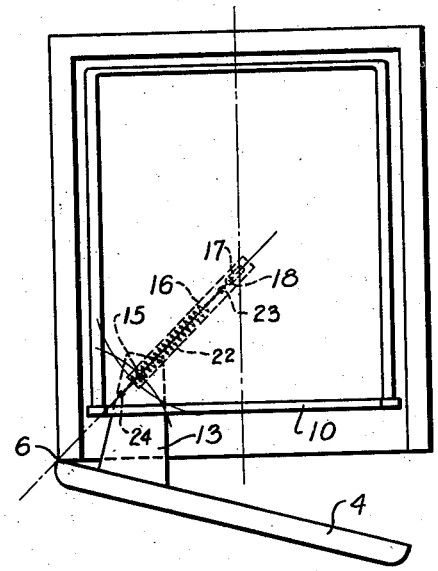
Figure 4 is a diagrammatic view illustrating the position assumed by the lever and spring when the door is partly open, as, for example, about 15° or 20°.

A tension spring 22, which may be a helical or spiral spring or any other suitable type of tension spring, is secured at one end to the lever 16 near its inner, slotted end secured to the bolt 18, as by hooking it over a lug or finger 23 punched out of the lever and extending upwardly therefrom in a rearward direction. The other end of the spring is secured to the bottom of the broiler rack 10, as by hooking it through a lug or ear 24 punched through the bottom of the rack. As is illustrated in Figure 4, the lug 24 is so located that, when the pin 15 and the hole 14 in lug 13 through which it passes are in a line with the hinge 6 of the door 4 and with the bolt 18 secured through the bottom of the rack 10, the spring 22 is in line with the center of the lever 16. In this way, when the hole 14 in the lug 13 passes in its arc closest to the bolt 18, the lever 16 is forced, through the pin 15, inwardly toward the bolt 18 so that the latter passes toward the outer end of the slot 17; that is, toward the end of the slot which is nearest the opening 3 of the broiler compartment.

Figure 3:
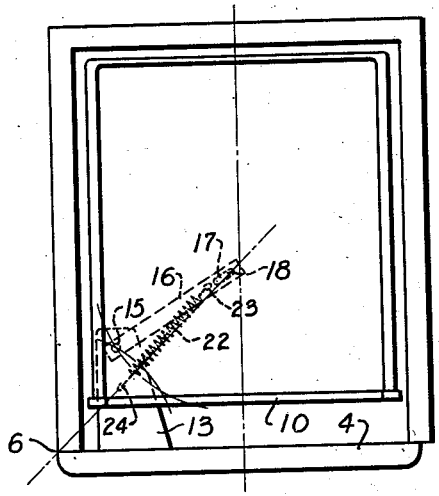
Figure 3 is a diagrammatic view illustrating the position assumed by the lever and spring of the broiler rack operating mechanism when the door is in fully closed position.

The action of the lever 16 and spring 22 will now be described in some detail; reference being made particularly to Figures 3, 4 and 5 of the drawings. In Figure 3, the door is illustrated in the closed position, in which there is only slight tension on the spring 22, only enough tension to hold the door closed being needed. Since the hole 14 in the lug 13 is fixed in position relative to the hinge 6 about which the door rotates, the hole 14 describes an arc centered at 6 when the door is opened and closed, this arc being illustrated in construction lines in Figures 3, 4 and 5 of the drawings. Due to the tension of the spring 22, which tends to pull the lever 16 away from the bolt 18, the pin 15 of the lever, if not affected by other forces, would tend to describe an arc about the bolt 18 as a center with the bolt located at the inner end of the slot 17, and this arc is also indicated by construction lines in Figures 3, 4 and 5. In the closed position of the door illustrated in Figure 3, the pin 15 is on the last-mentioned arc and this position also coincides with a point in the arc described by the hole 14 in the lug 13. The tension of the spring 22, which, in the closed position of the door is to the right of the lever 16, as seen in Figure 3, tends to force the lever and thus the lug 13 to the left, and thus holds the door 4 closed, so that no catch is needed on the stove 1 for that purpose.

When the door is opened slightly, say about 15° to 20°, the parts assume the position illustrated in Figure 4. The hole 14 in the lug 13, and thus the pin 15 on the lever 16, have been rotated about the arc of the hole 14 until they are in a line with both the bolt 18 and the hinge 6 of the door. Since this position of the pin 15 is inside the normal arc of the pin about the bolt 18 when the rack 10 is all the way inside the oven 2, the lever 16 is forced inwardly against the tension of the spring 22, moving its inner end so that the bolt 18 is in the outer end of the slot 17 in the lever. In this position, the spring is in maximum tension, and movement of the door 4 and the lever 16 in either direction is assisted by the tension of the spring. Thus, if the door is moved slightly inwardly from the position of Figure 4, the tension of spring 22 pulls the lever 16 and thus the lug 13 and the door 4 to the left, or in a closing direction until the parts assume the position illustrated in Figure 3. If the door is moved slightly outwardly from the position of Figure 4, the tension of the spring 22 pulls the lever 16, the lug 13 and the door 4 to the right until they reach a position like that illustrated in Figure 5. Actually, when the parts are left free to act only under the tension of the spring, they acquire sufficient momentum in moving from the position of Figure 4 to that of Figure 5 that the door 4 moves wide open to the position illustrated in full lines in Figure 1, carrying with it the broiler rack 10 by pulling on the lever 16. In this way, the spring and lever mechanism help both in closing and holding closed the door 4 and also in opening the door and pulling the rack out automatically.

Figure 5:
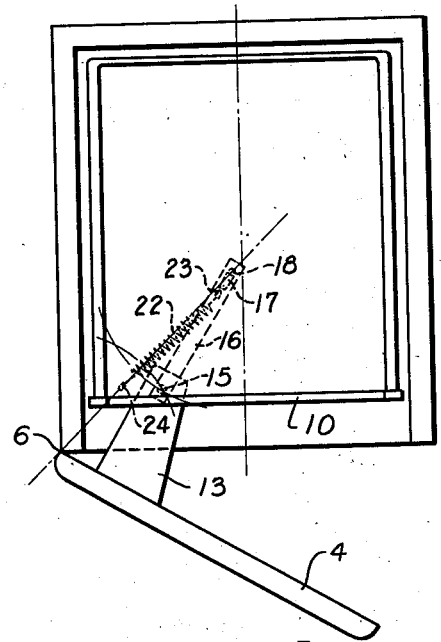
Figure 5 is a diagrammatic view illustrating the positions of the lever and spring when the door is opened further, as, for example, about 30° or 40°.

If it is desired to leave the door open slightly, as when necessary to look inside frequently during the cooking, the door can be left in the position of Figure 5, in which position the spring 22 is under very little tension and the parts will remain stationary because the tension of the spring is insufficient to overcome the friction of the parts. This position will permit frequent sightings of the food inside the broiling compartment without requiring the opening of the door. An additional advantage of this arrangement, particularly in electric stoves, is that the door will remain always in the same position and the heat within the broiler will thus be kept constant by the thermostat, so that the cooking will be even, rather than interrupted, as it would be were the door to be opened and closed often.

It will be observed that in the position illustrated in Figure 5, the pin 15 on the lever 16 has not yet passed beyond its normal arc of rotation about the bolt 18 when the rack 10 is all the way in, but that it is still on this arc. Thus, the rack 10 has not been moved outwardly, but is in its furthest inward position. Although the spring 22 is under some tension in this position, the tension is too slight to move the door and the rack against the friction of the parts. Of course, the spring is under the same tension when the parts are in the position of Figure 3, the closed position, the tension being sufficient to hold the door closed and increasing as the door is opened slightly.

I claim:

1. A stove comprising a broiling compartment having side walls and a door opening, brackets secured to said side walls, a broiler rack having inwardly extending ledges for supporting a pan and formed with outwardly extending flanges seating on said brackets for sliding movement through said door opening, a door hinged to one of said side walls for closing said opening and having a lug extending therefrom, a lever parallel to said rack and having a longitudinally extending slot therein at one end, means operatively associated with said slot by which said lever is slidably and pivotally attached to said broiler rack, means for pivotally and removably attaching said lever at its other end to said lug, a tension spring parallel to said rack connected at one end to the lever and at its other end connected to the rack, initial movement of the door in one direction causing the lug to align the lever with the spring and to move the lever inwardly relative to the rack resisted by the spring, and further movement in the same direction causing the spring and the lever to assume disaligned positions which will be accelerated by the action of the spring.

2. A stove comprising a broiling compartment having side walls and a door opening, a broiler rack having inwardly extending ledges for supporting a pan, cooperating means on said rack and the side walls of said compartment supporting said rack for sliding movement through said door opening, a door hinged to one of said side walls for closing said opening and having a lug projecting therefrom, a lever having a pin at one end thereof by which it is removably and pivotally attached to said lug and being slotted at its other end for slidable and pivotal attachment to said rack, a helical spring connecting said rack and said lever at a point near the slotted end of said lever, movement of said door from either a fully closed or a fully open position to a position open about twenty degrees causing the lug to align the lever with the spring and to slide the lever inwardly relative to the rack against the force of the spring.

3. A stove comprising a broiling compartment having side walls and a door opening, a broiler rack having inwardly extending ledges for supporting a pan, cooperating means on said rack and the side walls of said compartment supporting said rack for sliding movement through said door opening, a door hinged to one of said side walls for closing said opening and having a lug protruding therefrom, a lever parallel to said rack pivotally attached at one end to said lug and having a slot therein, means operatively associated with said slot by which said lever is pivotally and slidably attached at its other end to said rack, a spiral spring parallel to said rack connected at one end near the latter end of said lever and at its other end to said rack, the movement of said door to a nearly closed position moving the lug to align the lever with the spring and to slide the lever inwardly relative to said rack, thereby stretching the spring to put it in tension, from which position of alignment of spring and lever movement of said door, lug and lever in either direction will be assisted by the contraction of said spring.

4. A stove comprising a broiling compartment having side walls and a door opening, brackets secured to said side walls, a broiler rack having inwardly extending ledges for supporting a pan and formed with outwardly extending flanges seating on said brackets for sliding movement through said door opening, a door hinged to one of said side walls for closing said opening and having a lug extending therefrom, a horizontal lever pivotally and removably attached at one end to said lug and being slotted at its other end for slidable and pivotal attachment to said rack, a horizontal tension spring connecting said rack with said lever at a point near the slotted end of said lever, the lug approaching closest to the point of attachment of said lever to said rack and thus forcing said rack inwardly when said door is open about twenty degrees, thereby placing said spring under a tension which is sufficient to assist the movement of said lever, lug and door away from the aforesaid position of opening of said door.

JAMES F. CORN, Jr.

References Cited in the file of this patent

UNITED STATES PATENTS

| Number | Name | Date |
|---|---|---|
| 390,200 | Burr | Oct. 2, 1888 |
| 2,268,481 | Hardwick | Dec. 30, 1941 |
| 2,299,052 | Dexter | Oct. 13, 1942 |
| 2,334,641 | Moecker | Nov. 16, 1943 |
| 2,343,409 | Goldberg | Mar. 7, 1944 |
| 2,473,467 | Burt | June 14, 1949 |